May 7, 1940. R. E. MARBURY 2,200,094
WATER COOLED CAPACITOR
Filed Sept. 21, 1938 3 Sheets-Sheet 1

INVENTOR
Ralph E. Marbury.
BY
ATTORNEY

May 7, 1940.  R. E. MARBURY  2,200,094
WATER COOLED CAPACITOR
Filed Sept. 21, 1938  3 Sheets-Sheet 2

WITNESSES:

INVENTOR
Ralph E. Marbury.
BY
ATTORNEY

Patented May 7, 1940

2,200,094

UNITED STATES PATENT OFFICE 2,200,094

WATER COOLED CAPACITOR

Ralph E. Marbury, Wilkinsburg, Pa., assignor to Westinghouse Electric & Manufacturing Company, East Pittsburgh, Pa., a corporation of Pennsylvania Application September 21, 1938, Serial No. 230,938

6 Claims. (Cl. 175—41)

The present invention relates to power capacitors, and more particularly to water cooled capacitors intended for high frequency service.

The design of power capacitors is largely determined by the permissible voltage stress on the working dielectric and by the temperature rise of the capacitor resulting from the heat generated by the losses in the dielectric. In the design of capacitors for power factor correction on frequencies of the order of 60 cycles, the permissible limits of voltage stress and temperature rise are reached at about the same rating, so that neither factor limits the design more than the other, and it is not necessary or customary to provide any special means for cooling the capacitor, since no material increase in rating would be obtained by doing so.

When capacitors are designed to operate at higher frequencies as, for example, for power factor correction in connection with induction furnace installations, which are normally operated at frequencies of 1000 or 2000 cycles, if the same voltage stress on the dielectric is used as in low frequency designs, the kva. rating obtainable for a given size tank should increase approximately proportionately to the frequency. As the rating is increased, however, the losses also increase and the temperature rise produced by the losses becomes the limiting factor in the design of high frequency capacitors.

In the past, attempts have been made to artificially cool high frequency capacitors in order to increase the rating by placing the capacitor units in tanks of water or by immersing the capacitor units in tanks of oil through which cooling coils were run. These methods made it possible to somewhat increase the rating of the capacitor, but the increase in rating obtainable in this way is definitely limited by the large temperature drop between the capacitor insulation and the surface of the capacitor case. This is due to the high thermal resistance of the high quality insulating materials usually used. The major portion of the heat generated by the losses in the dielectric flows out along the metallic foil path, and is conducted through the insulation only to a very small extent.

It has also been proposed to reduce the temperature of high frequency capacitor units by placing a cooling coil inside of the capacitor case in order to cool the liquid dielectric directly. This arrangement gives only a relatively small improvement over the arrangements described above, however, because of the large temperature drop in the liquid dielectric itself which is a good insulating medium and has very poor thermal conductivity.

The capacitor of the present invention is cooled by a cooling coil placed inside the capacitor case and connected directly to the capacitor foils by a permanent connection of good thermal conductivity, so that the heat generated in the capacitor is withdrawn through the metallic foils themselves directly to the cooling means, and no reliance is placed on heat conduction through the insulation. A water cooled capacitor of this general type is disclosed in the copending application of R. E. Marbury and P. H. Brace, Serial No. 194,156, filed March 5, 1938, now Patent No. 2,151,787, issued March 28, 1939, and assigned to Westinghouse Electric & Manufacturing Company, and the capacitor of the present invention may be regarded as a substantial improvement over the design shown in the patent.

The object of the invention, therefore, is to provide an improved, water-cooled, high-frequency capacitor in which the heat generated in the capacitor is withdrawn directly from the metallic foils by means of a water cooling coil, and which is so arranged that the maximum cooling efficiency and economy in manufacture are obtained.

Since the very high rating obtained in a capacitor of this type results in large currents through the terminals and internal leads of the capacitor, it is necessary to provide some means to cool them, and it is accordingly a further object of the invention to provide means for effectively cooling the case and terminals of the capacitor.

A still further object is to provide a cooling coil for use in a water cooled capacitor which has a minimum resistance to water flow so that the capacitor can be operated on relatively low water pressures.

The invention will be more fully understood from the following detailed description taken in connection with the accompanying drawings in which.

The capacitor of the present invention is contained in a sheet metal case 1, which is preferably of welded construction so as to render the joints leakproof, and consists of a plurality of capacitor sections 2 which are assembled in a stack in the case. As shown in the present instance, eight of these sections are used and they are disposed in the case in two groups of four sections each, which may be connected either in series or in parallel to permit operation on two different voltages. After assembly, the capacitor case is filled with a liquid dielectric medium 3 of any suitable type.

The sections or windings used in capacitors of the present type are commonly formed of two metallic foils, usually of aluminum, which constitute the electrodes, and two dielectric layers, usually of thin, high quality paper. The foils and paper dielectric are alternated and are wound into a coil on a mandrel which is then removed and the coil flattened and impregnated with a suitable insulating medium, thus forming a flat capacitor section comprising a plurality of alternate layers of metallic foil and paper dielectric. In the usual practice, a plurality of terminal tabs of tinned copper are inserted in contact with the foils during the winding operation to provide terminals for connecting the leads to the section.

Figure 1:
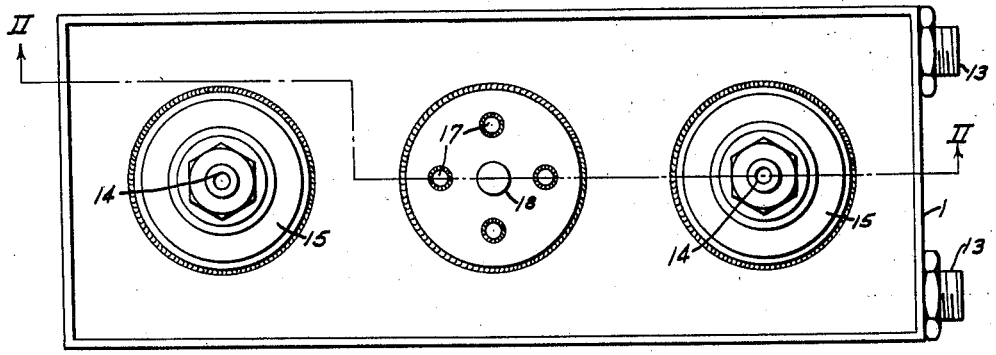
Figure 1 is a plan view of a capacitor unit.
Figure 2:
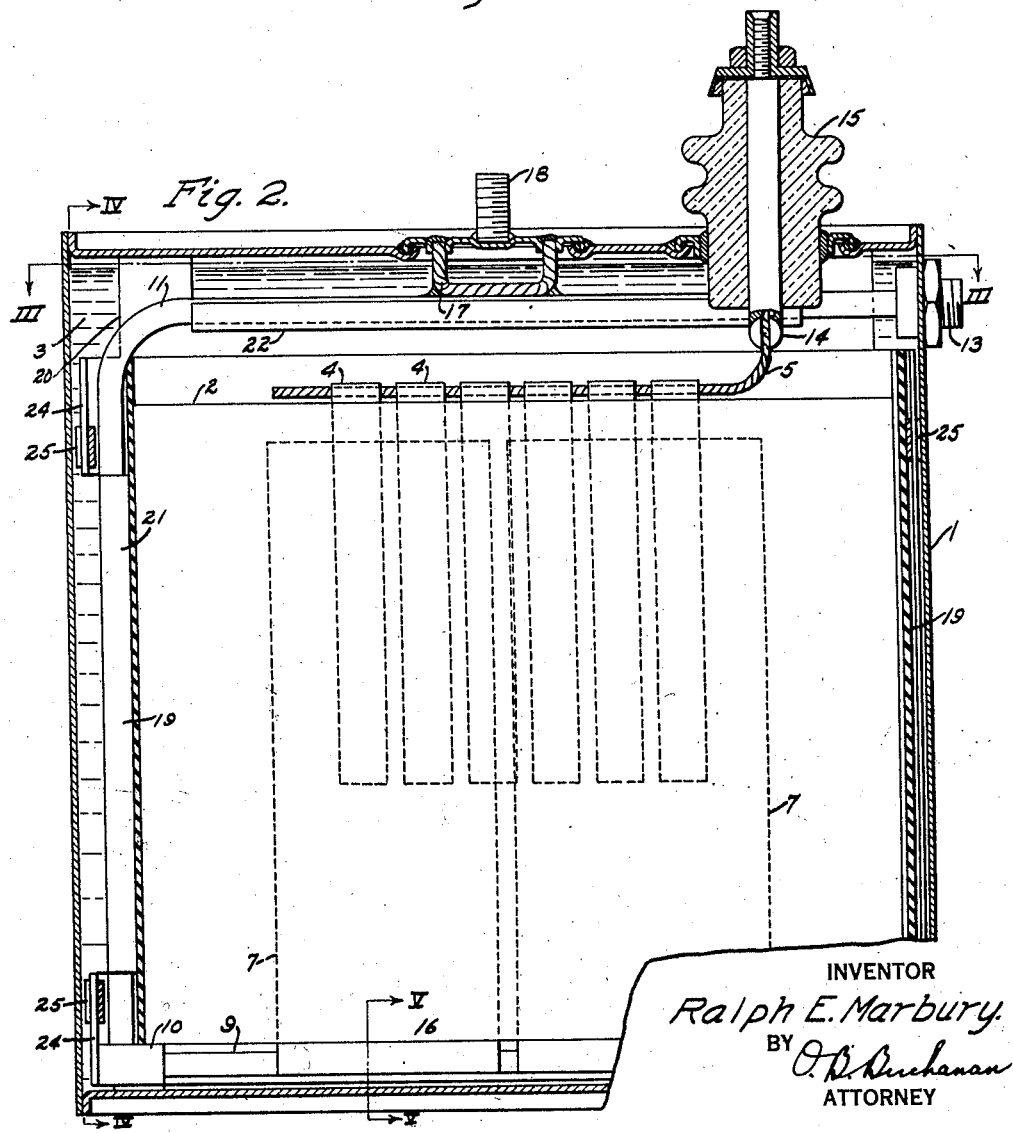
Fig. 2 is a longitudinal sectional view approximately on the line II—II of Fig. 1.
Figure 3:
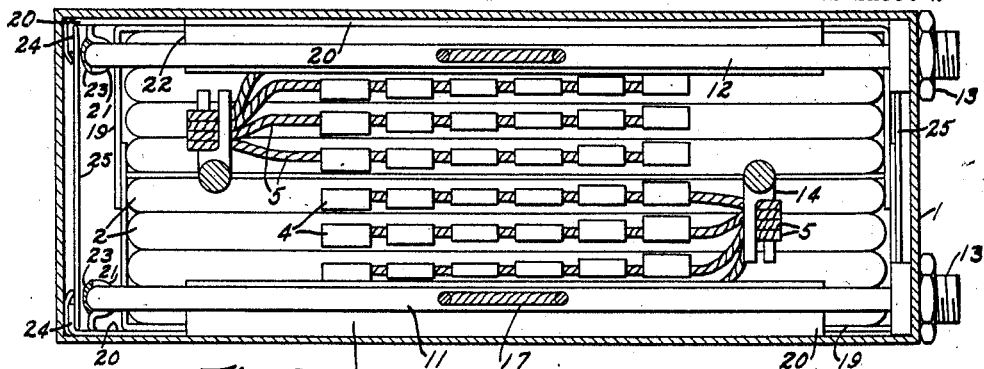
Fig. 3 is a plan view, partly in section, approximately on the line III—III of Fig. 2.
Figure 4:
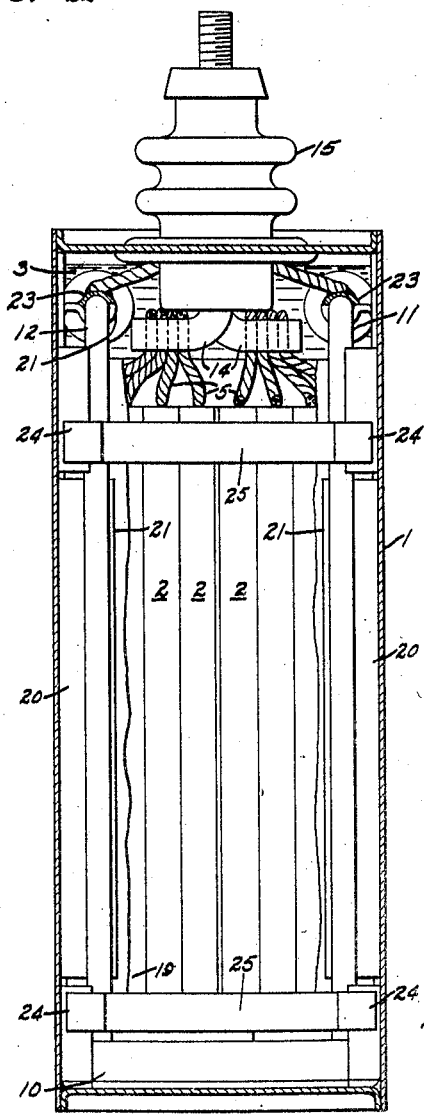
Fig. 4 is an end view, partly in section, on the line IV—IV of Fig. 2.
Figure 5:
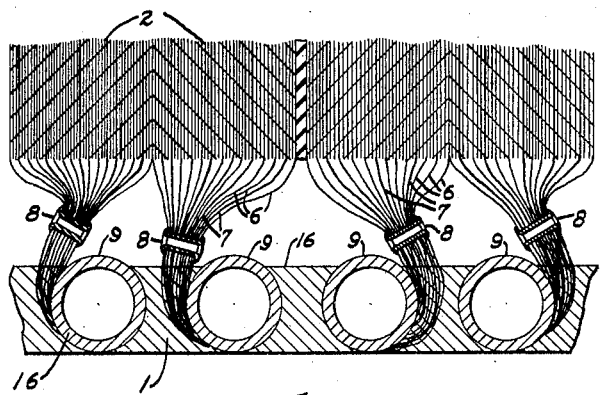
Fig. 5 is a fragmentary transverse sectional view on an enlarged scale, approximately on the line V—V of Fig. 2.

The capacitor sections used in the capacitor of the present invention are in general of the type described above but differ from the usual practice in certain important respects. The metallic foils constituting one electrode are permitted to extend a small distance beyond the paper dielectric at one side of the section and a plurality of tinned terminal tabs 4 are inserted in contact with these foils to provide one terminal for the section in the usual manner. This will be referred to as the high voltage terminal. Subsequent to the assembly of the capacitor section, the terminal tabs 4 are clamped around a suitable cable 5 and soldered thereto to provide a lead for connection to the high voltage terminal of the unit. The foils 6 constituting the other electrode of the capacitor section are extended a substantial distance beyond the paper dielectric at the opposite side of the section, and plates or sheets 7 of copper or other easily solderable material of good heat conductivity are inserted during the winding operation in contact with at least some of these foils. These plates 7 extend through the section almost to the opposite side and provide a path of high thermal conductivity for the escape of heat generated in the section. The foils 6 and copper plates 7 are brought together beyond the edge of the paper dielectric, as shown in Fig. 5, and are solidly fastened together by eyelets 8 in order to form the low voltage terminal of the section. Aluminum foil is commonly used for capacitor foils because it is readily available in sufficiently thin sheets for this purpose and is relatively inexpensive. It is necessary, therefore, to use the copper tabs and plates described above, since copper can be readily soldered to the terminal leads and also to the cooling coil in the manner to be described hereinafter. It is to be understood, however, that the invention is not limited to the use of a capacitor section using aluminum foils with copper plates inserted in contact with them, but that, if available, a foil might be used of copper or other easily solderable metal, and in this case the copper plates 7 could be dispensed with and sufficient thickness of foils provided to give a path of high thermal conductivity for removing the heat from the capacitor section.

Figure 6:
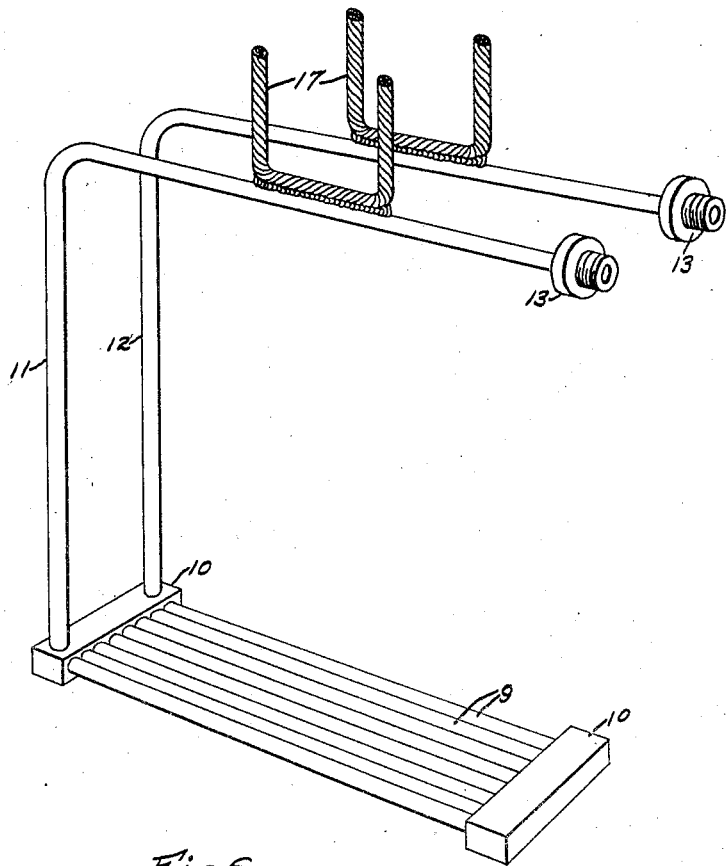
Fig. 6 is a perspective view of a water cooling coil.

In order to effectively withdraw the heat from the capacitor sections, a water cooling coil is provided in the case. This coil, as clearly shown in Fig. 6, consists of a plurality of tubes 9, preferably of copper, which are placed parallel to each other and extend between header blocks 10 at each end. Adjacent tubes are connected together at their ends within the blocks 10, so that a cooling grid is formed through which the water flows from one tube to the next in series and from end to end of the grid. Inlet and outlet tubes 11 and 12, respectively, are fastened in the block 10 at one end of the grid and connected with the end of the outside tube at each side. The grid consisting of the tubes 9 and blocks 10 is placed in the bottom of the capacitor case 1 and extends from end to end thereof. The inlet and outlet tubes 11 and 12 extend vertically upward at one end of the case 1 and then run horizontally to the opposite end of the case where they are fitted with bushings 13 which extend through the case to provide for connection to an external water system.

The capacitor sections 2, as described above, are assembled in the case in two groups of four sections each which may be separated by a pressboard spacer. The sections are disposed with the high voltage terminals 4 extending upward, and the leads 5 to which these terminals are soldered are secured in studs 14 which extend through the top of the case 1 through porcelain bushings 15 to form high voltage terminals for the unit. The low voltage terminals of the capacitor sections, consisting of the foils 6 and copper plates 7, extend downwardly into the spaces between the tubes 9 of the cooling coil and are permanently and solidly joined to these tubes by soldering, as indicated at 16, or by any other similar means which provides a molecularly integral connection of permanently good thermal and electrical conductivity.

Short lengths of copper cable 17 are soldered to the tubes 11 and 12 at the middle of their upper horizontal portions, and these cables are soldered or otherwise connected to a low voltage terminal 18 which is secured in the top of the case 1.

The capacitor sections 2 are enclosed by insulating side channels 19 of press board or similar insulating material, and are held firmly in position by metal clamp plates 20 which are placed outside the insulating channels 19 and are substantially in contact with the case 1. These clamp plates are generally rectangular in shape but are formed with bent-over portions 21 at one end which are bent inwardly and formed into channels of generally semi-circular cross-section running vertically along the edges of the clamp plates. Similar bent-over portions 22 are formed along the upper edge of each clamp plate and are similarly formed into channels of generally semi-circular cross-section running horizontally along the upper edges of the clamp plates. The inlet and outlet tubes 11 and 12 of the cooling coil are placed in these channels and are securely soldered therein, as indicated at 23, to provide a permanent connection of good thermal conductivity so that they will effectively withdraw heat from the clamp plates and the capacitor case. The clamp plates are also formed with inwardly extending lugs 24 at each end which have slots in which strap members 25 are secured to draw the clamp plates tightly together and thus hold the capacitor sections firmly in place.

This capacitor unit may be operated either with the two groups of sections connected in series, in which case the leads to the external circuit are connected to the terminal studs 14, or it may be operated on a lower voltage with the two groups of sections connected in parallel, in which case the high voltage terminal studs 14 are tied together and one of the leads to the external circuit is connected to the low voltage terminal 18. When operated in this manner, it will be seen that the cooling coil, consisting of the tubes 9 together with the inlet and outlet tubes 11 and 12, acts as a water cooled conductor to connect the low voltage terminals of the capacitor sections to the terminal 18. This water cooled conductor is quite necessary when this connection is used because of the high currents that will flow through the terminal 18.

Very effective cooling of the capacitor case and terminals is obtained by the use of metal clamp plates 20 soldered directly to the cooling coil, since these plates have high thermal conductivity and are substantially in contact with the case over a considerable area so that a path is provided for the direct flow of heat from the case and terminals to the cooling coil. This is an important feature of the invention since the high kva. rating obtainable results in relatively large currents through the terminals and it is necessary, therefore, to make some provision for cooling them. It should be noted that this arrangement also makes it possible to effectively utilize the entire length of the cooling coil so that the maximum efficiency of cooling is obtained, giving a very large increase in the kva. rating for a unit of given size or making it possible to materially reduce the size, and therefore the cost, of a unit of given rating.

It is also to be noted that the cooling coil is so designed that it may be manufactured at relatively low cost, and that it does not occupy a large amount of space in the case, and is so arranged that the upper part of the assembly is left clear, so that taps could be provided for operation on intermediate voltages, if desired, without making any changes in the design of the unit. The resistance of the coil to the flow of water is quite low so that a high pressure source of cooling water is not necessary, and the unit can be operated on relatively low water pressure.

It will be apparent, therefore, that a water cooled capacitor unit has been provided which is of relatively simple construction, but which gives very effective cooling and permits the highest possible rating for a given size case. Although a specific embodiment of the invention has been illustrated and described, it is to be understood that it is not limited to the exact details of construction shown, but that in its broadest aspect it includes all equivalent modifications and embodiments which come within the scope of the appended claims.

I claim as my invention:

1. In a capacitor having a case, cooling means comprising a plurality of parallel tubes disposed in the bottom of the case and connected together at their ends to form a cooling grid through which a liquid cooling medium may flow, inlet and outlet tubes for said cooling medium connected to one end of the grid at opposite sides of the case, said tubes extending vertically to the upper part of the case and then horizontally to the opposite end of the case, a plurality of capacitor sections, each of said sections comprising alternate layers of conducting material and dielectric material, certain of said layers of conducting material extending beyond the dielectric material at one side of the section and being solidly joined together and to the tubes of said cooling grid by a permanent connection of good thermal conductivity, said capacitor sections being disposed in a stack in the case, a metal clamp plate on each side of the stack to hold the capacitor sections in place, said clamp plates being generally rectangular and disposed so that their edges are in contact with said inlet and outlet tubes, respectively, and means joining the plates to the tubes with a connection of good thermal conductivity.

2. In a capacitor having a case, cooling means comprising a plurality of parallel tubes disposed in the bottom of the case and connected together at their ends to form a cooling grid through which a liquid cooling medium may flow, inlet and outlet tubes for said cooling medium connected to one end of the grid at opposite sides of the case, said tubes extending vertically to the upper part of the case and then horizontally to the opposite end of the case, a plurality of capacitor sections, each of said sections comprising alternate layers of conducting material and dielectric material, certain of said layers of conducting material extending beyond the dielectric material at one side of the section, plates of material of high thermal conductivity extending into the section in contact with at least some of said last mentioned layers, said plates and the extending portions of said layers being solidly joined together to form a terminal for the section, said capacitor sections being disposed in a stack in the case, means for connecting the terminals of the sections to the tubes of the cooling grid with a permanent connection of good thermal conductivity, a metal clamp plate on each side of the stack to hold the capacitor sections in place, said clamp plates being generally rectangular and disposed so that their edges are in contact with said inlet and outlet tubes, respectively, and means joining the plates to the tubes with a connection of good thermal conductivity.

3. A capacitor comprising a case, a plurality of capacitor sections, each of said sections consisting of a plurality of conducting sheets separated by sheets of dielectric material, certain of said conducting sheets extending slightly beyond the dielectric material at one side of the section and having terminal means for connection to a high voltage terminal, the others of said conducting sheets extending a greater distance beyond the dielectric material at the other side of the section and being solidly joined together to form a low voltage terminal for the section, cooling means in the case consisting of a plurality of parallel tubes disposed in the bottom of the case and connected together at their ends to permit a liquid cooling medium to flow through them in series, said capacitor sections being assembled in a stack in the case with their low voltage terminals extending downward in the spaces between the cooling tubes and being solidly joined to the tubes by a connection of good thermal conductivity, metal clamp plates on each side of the stack of capacitor sections, and inlet and outlet tubes for said cooling medium, each of said tubes running vertically at one end of the case along the edge of one of said clamp plates and then horizontally to the opposite end of the case along the top edge of the clamp plate and being permanently joined to said plate by a connection of good thermal conductivity.

4. A capacitor comprising a case, a plurality of capacitor sections, each of said sections consisting of a plurality of conducting sheets separated by sheets of dielectric material, certain of said conducting sheets extending slightly beyond the dielectric material at one side of the section and having terminal means for connection to a high voltage terminal, the others of said conducting sheets extending a greater distance beyond the dielectric material at the other side of the section and being solidly joined together to form a low voltage terminal for the section, cooling means in the case consisting of a plurality of parallel tubes disposed in the bottom of the case and connected together at their ends to permit a liquid cooling medium to flow through them in series, said capacitor sections being assembled in a stack in the case with their low voltage terminals extending downward in the spaces between the cooling tubes and being solidly joined to the tubes by a connection of good thermal conductivity, metal clamp plates on each side of the stack of capacitor sections, and inlet and outlet tubes for said cooling medium, each of said tubes running vertically at one end of the case along the edge of said clamp plates and then horizontally to the opposite end of the case along the top edge of the clamp plate and being permanently joined to said plate by a connection of good thermal conductivity, and a low voltage terminal mounted in the top of the case and connected to said inlet and outlet tubes.

5. A capacitor comprising a case, a plurality of capacitor sections, each of said sections consisting of a plurality of conducting sheets separated by sheets of dielectric material, certain of said conducting sheets extending slightly beyond the dielectric material at one side of the section and having terminal means for connection to a high voltage terminal, the others of said conducting sheets extending a greater distance beyond the dielectric material at the other side of the section and being solidly joined together to form a low voltage terminal for the section, cooling means in the case consisting of a plurality of parallel tubes disposed in the bottom of the case and connected together at their ends to permit a liquid cooling medium to flow through them in series, said capacitor sections being assembled in a stack in the case with their low voltage terminals extending downward in the spaces between the cooling tubes and being solidly joined to the tubes by a connection of good thermal conductivity, metal clamp plates on each side of the stack of capacitor sections, said clamp plates being generally rectangular and having channels formed in their edges along two adjoining sides, and inlet and outlet tubes for said cooling medium, each of said tubes running vertically at one end of the case along the edge of one of the clamp plates and then horizontally to the opposite end of the case along the upper edge of the clamp plate, the tubes being disposed in said channels and permanently united to the clamp plates by joints of good thermal conductivity.

6. A capacitor comprising a plurality of capacitor sections, each of said sections consisting of a plurality of layers of conducting material separated by layers of dielectric material, certain of said conducting layers having terminal means at one side of the section and the others of said conducting layers being extended beyond the dielectric layers at the opposite side of the section and being joined together to form a terminal, a case in which said capacitor sections are contained, a liquid dielectric medium substantially filling the case, cooling means in the case for withdrawing heat from the capacitor sections, said cooling means including tubes through which a cooling medium may be circulated, said extended conducting layers of the capacitor sections being joined to the tubes with a permanent connection of good thermal conductivity, and metal clamp plates disposed in the case on opposite sides thereof to hold the capacitor sections in place, said clamp plates being in contact with the tubes of said cooling means and joined thereto with a permanent connection of good thermal conductivity.

RALPH E. MARBURY.